United States Patent [19]

Kluting et al.

[11] 4,456,300
[45] * Jun. 26, 1984

[54] SEAT BACK ADJUSTER

[75] Inventors: Bernd A. Kluting, Radevormwald, Fed. Rep. of Germany; Vikram H. Zaveri, Springfield, Mich.

[73] Assignee: Keiper Recaro, Inc., Battle Creek, Mich.

[*] Notice: The portion of the term of this patent subsequent to Oct. 26, 1999 has been disclaimed.

[21] Appl. No.: 418,784

[22] Filed: Sep. 16, 1982

Related U.S. Application Data

[63] Continuation of Ser. No. 72,013, Sep. 4, 1979, Pat. No. 4,355,846.

[51] Int. Cl.³ ............................................. A47C 1/026
[52] U.S. Cl. ....................................... 297/366; 16/292
[58] Field of Search ................................. 297/366–369, 297/354, 355, 361, 362; 16/292, 324

[56] References Cited

U.S. PATENT DOCUMENTS

| | | | |
|---|---|---|---|
| 3,667,804 | 6/1972 | Yasui et al. | 297/366 X |
| 3,902,757 | 9/1975 | Yoshimura | 297/367 |
| 3,999,247 | 12/1976 | Cremer | 297/369 X |

Primary Examiner—William E. Lyddane

[57] ABSTRACT

A vehicle seat back adjuster with manually releasable forward tilt lock providing fine increments of adjustment through the combination of a translation overdrive for a fine tooth ratchet accommodated by accurate location of extremity stops and special provision for assuring full tooth engagement at extremity positions.

12 Claims, 14 Drawing Figures

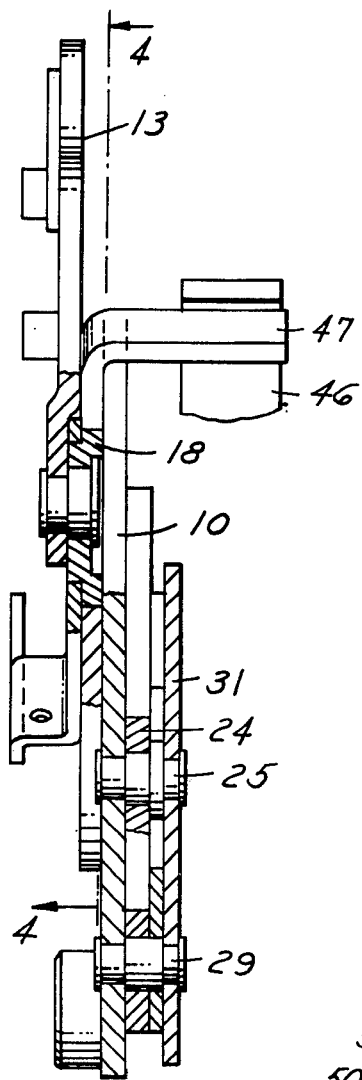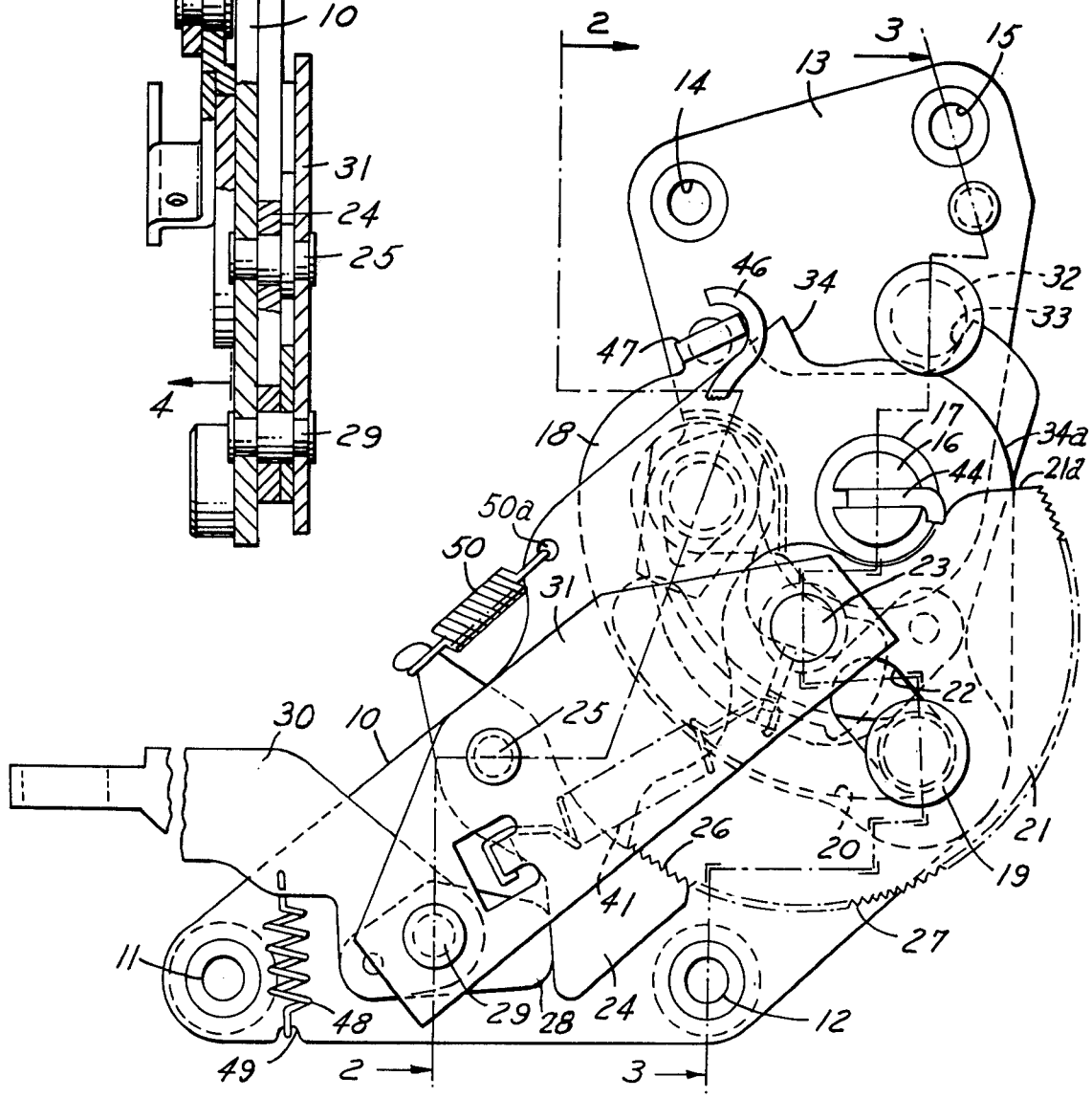

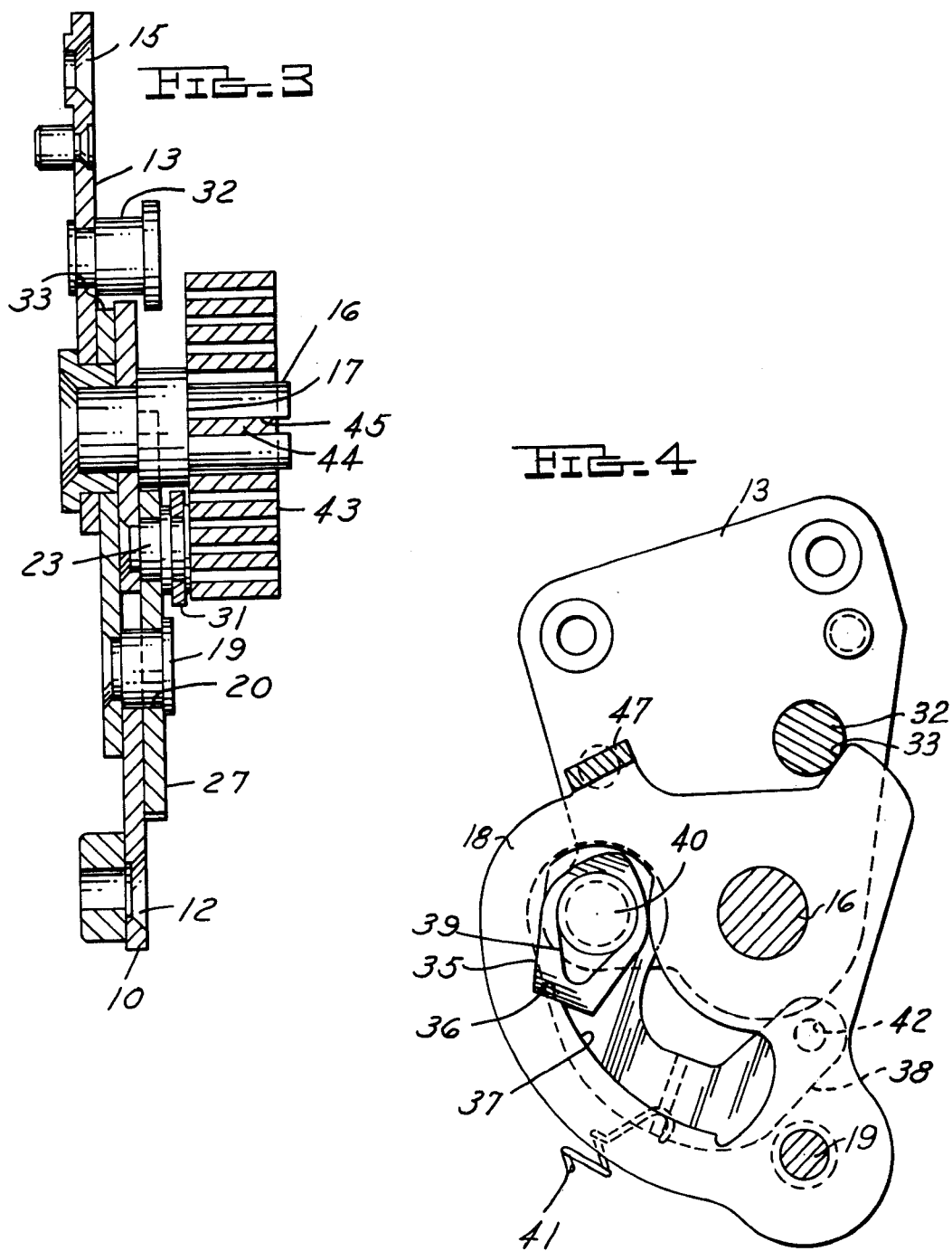

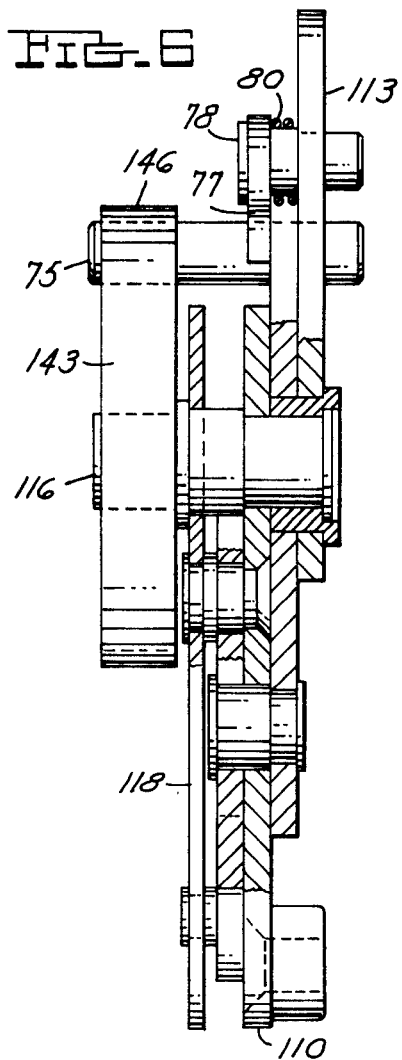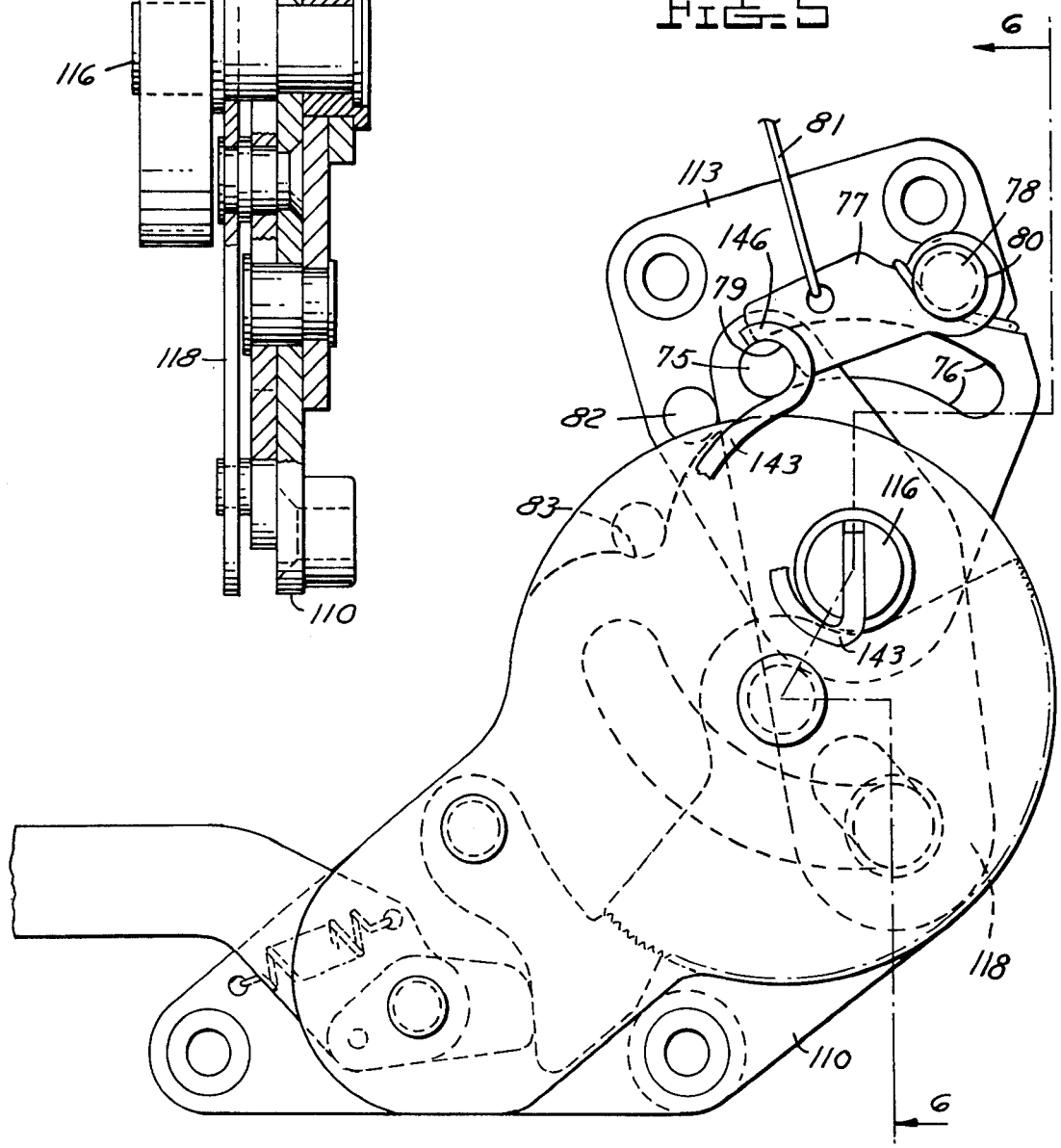

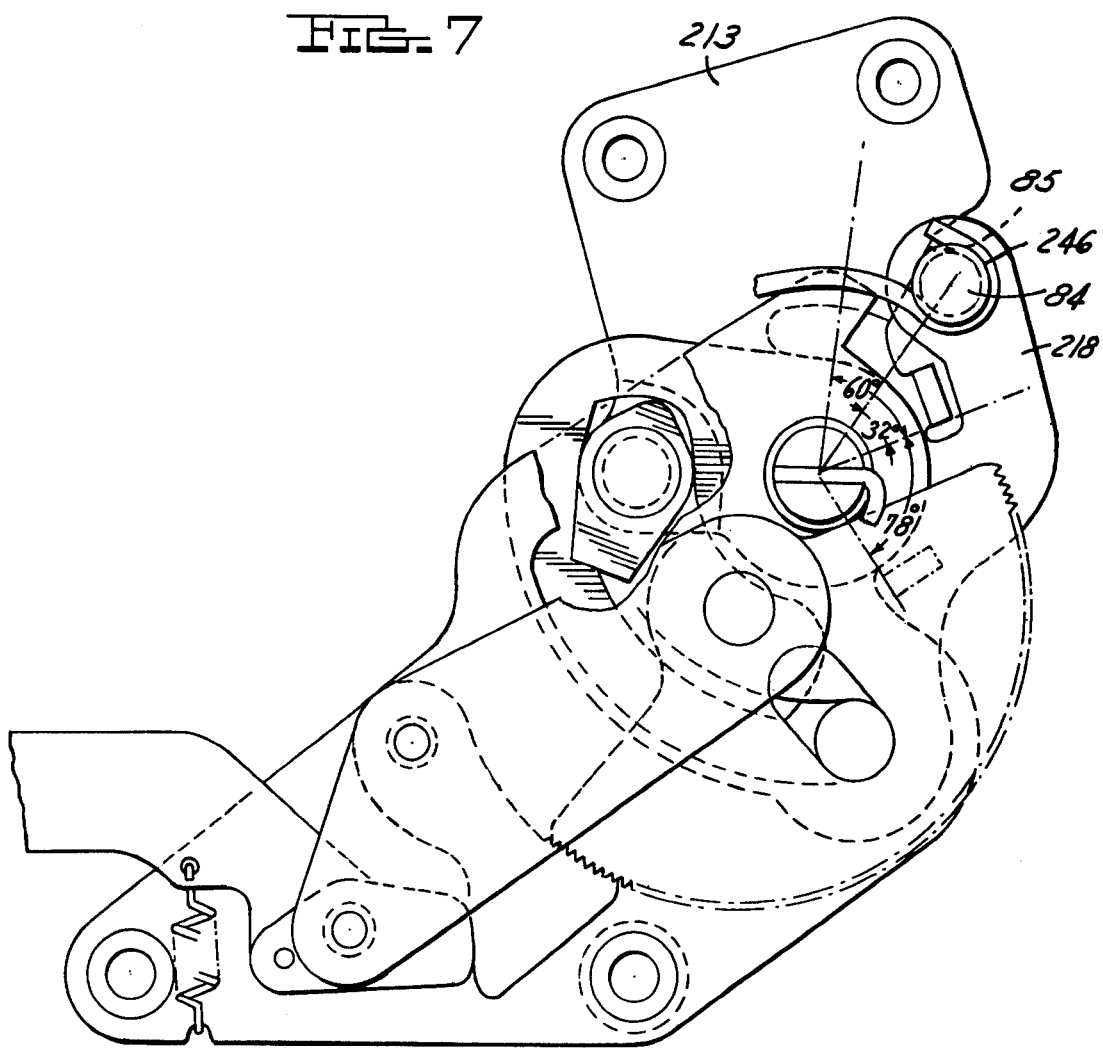

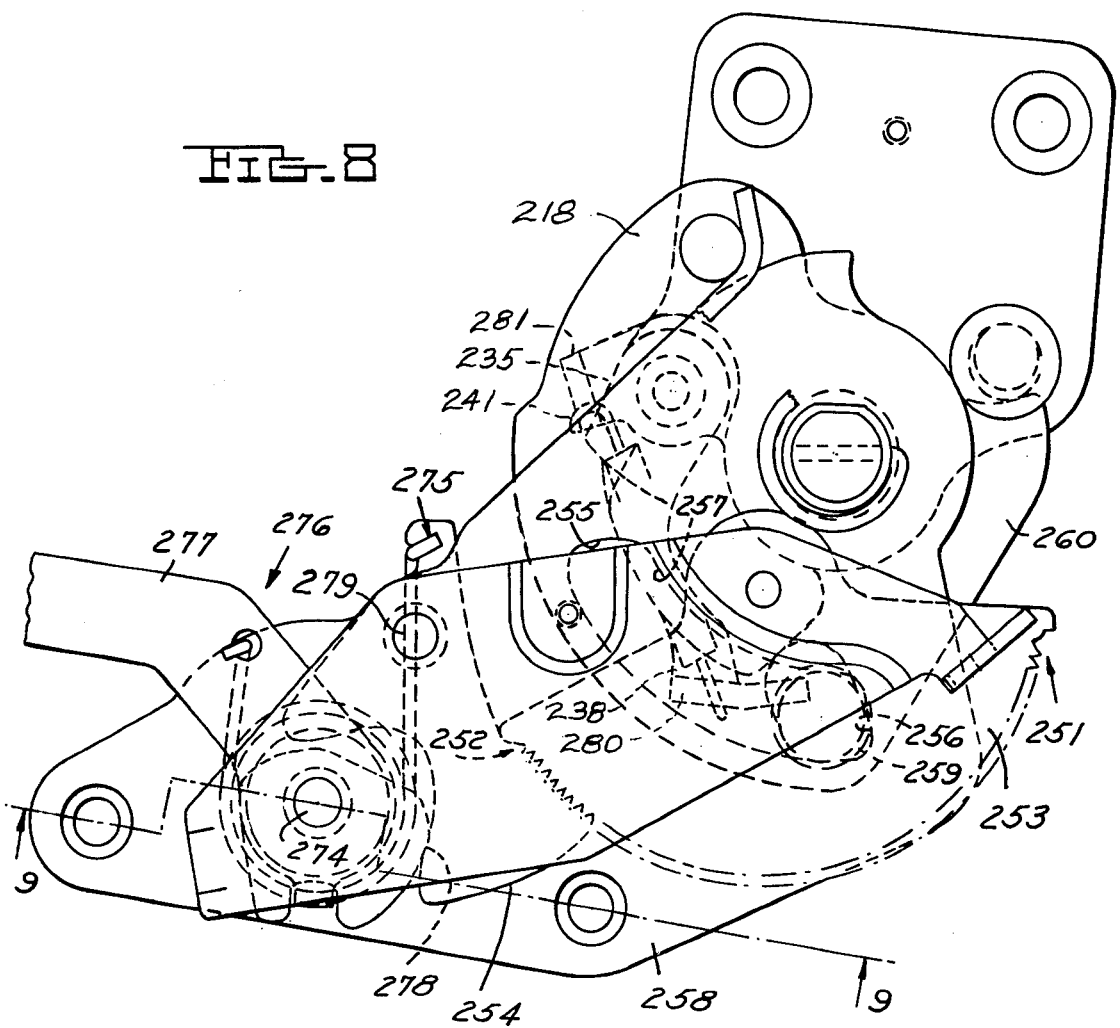
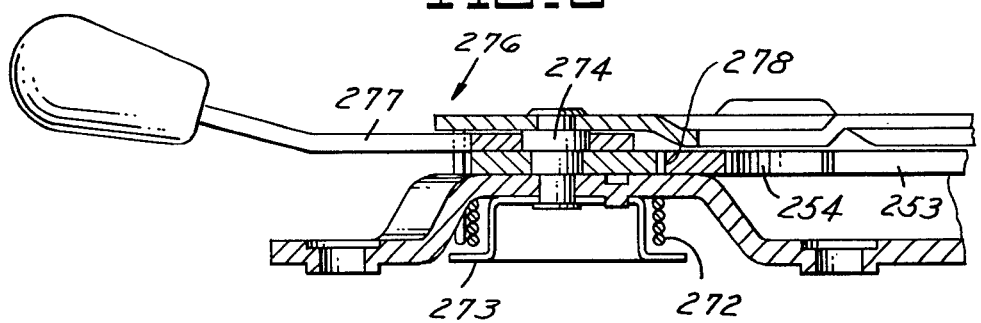

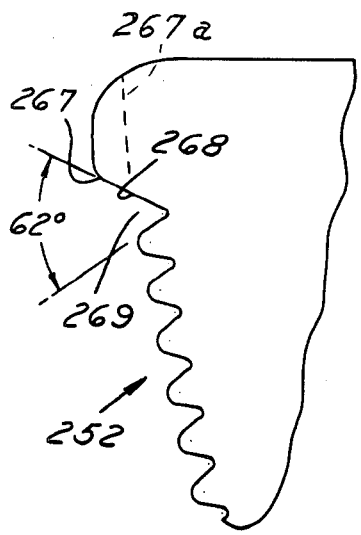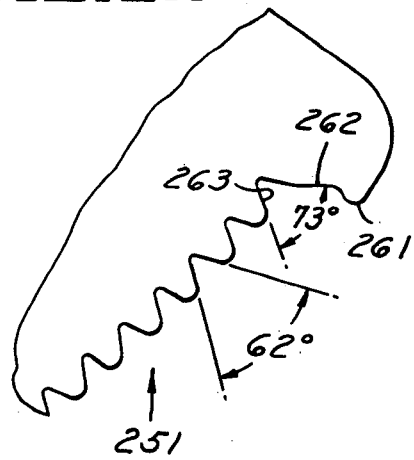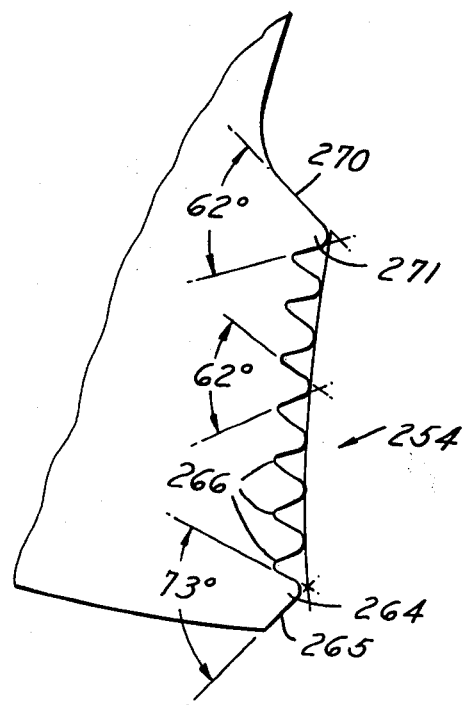

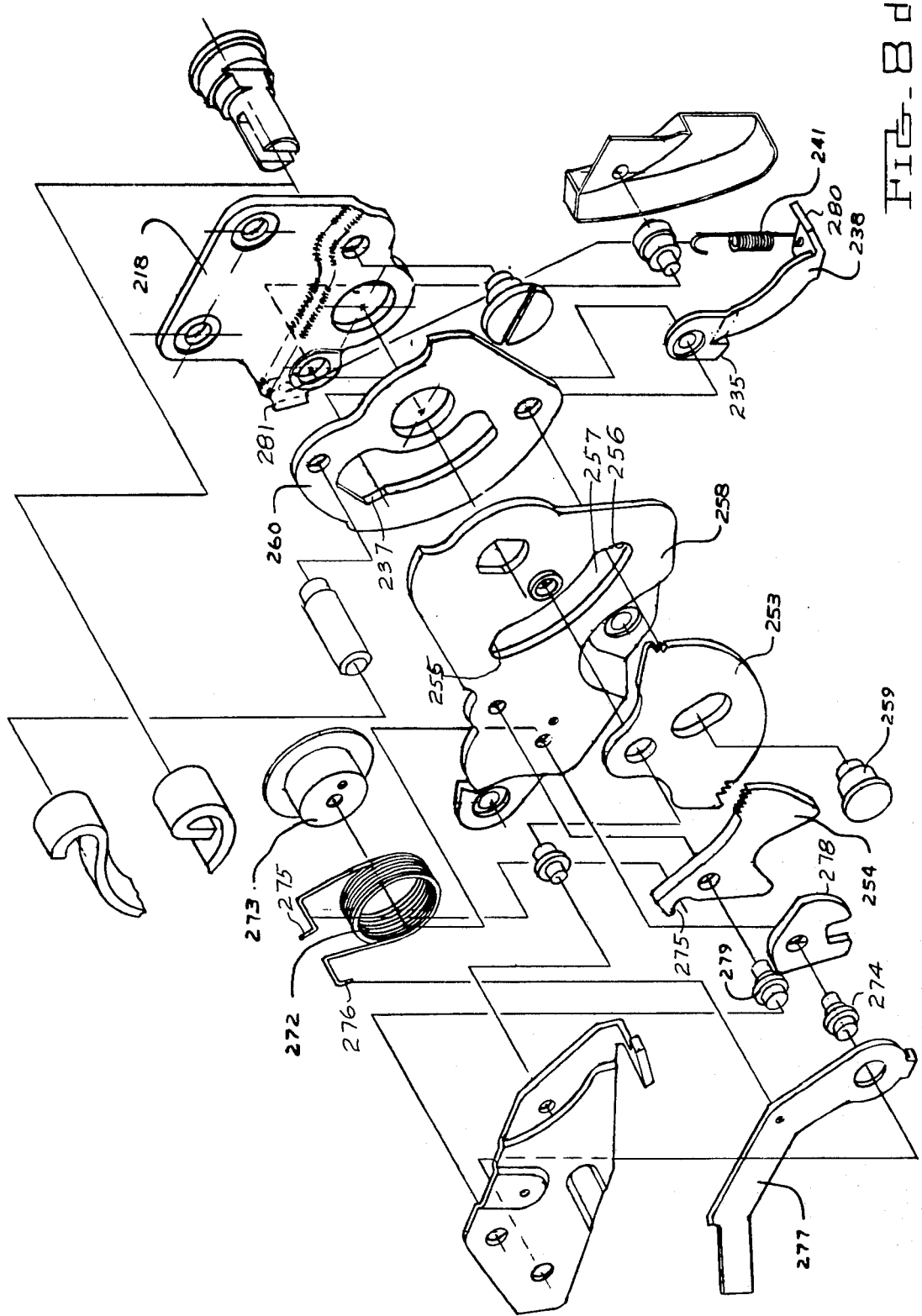

SEAT BACK ADJUSTER

This is a continuation, of application Ser. No. 06/072,013, filed 9/4/79 now U.S. Pat. No. 4,355,846.

BACKGROUND OF THE INVENTION

Passenger car seat back adjusters having toothed ratchet and pawl positioning in 3° increments are known in the art; for example, as disclosed in U.S. Pat. No. 3,999,247 and copending application Ser. No. 945,303. It is also known to achieve finer steps of adjustment through the provision of a translation overdrive linkage between the seat back and the toothed ratchet so that the arcuate movement of the ratchet segment may be substantially double the angular movement of the seat back thereby achieving for example 1½° increments of seat back adjustment with 3° ratchet teeth.

The provision of still finer increments of adjustments through the use of finer pitch teeth has been limited by the tolerances involved in the extremity stop positions combined with the possibility of pawl and ratchet teeth being blocked from full engagement at the extremity positions thereby causing malfunction and possible damage to the respective teeth upon application of loads to the seat back.

BRIEF DESCRIPTION OF THE PRESENT INVENTION

The present seat back adjuster employs a combination of improved accuracy in stop location for extremity of adjustment together with a special provision at each end of the ratchet sector which cooperates with the pawl extremities to prevent misengagement which could otherwise result from overpassing the last incremental position at which full tooth engagement can be achieved. With this provision any overtravel beyond the last increment for full tooth engagement results in a positively assured back travel to such last increment position in response to pawl engagement. Such provision together with a translation overdrive linkage between the seat back and adjustment ratchet achieve a substantial improvement in fineness of adjustment which may be reduced to approximately 1° increments of seat back adjustment. Improvement in accuracy of stop location has been achieved, relative to copending application Ser. No. 945,303 for example where stop engagement occurred at a relatively short radius of an element pivoting with seat back angular adjustment, by providing a stop having a relatively longer radius relative to seat back angular adjustment thus achieving an improvement in accuracy for a given tolerance in relative stop locating surfaces.

A manually releasable forward dump provision for tilting the seat back to accommodate passenger movement to and from the back seat behind the adjustable seat back has been incorporated to operate through the same pivotal connection as the seat back adjustment without being affected in its forward limit by adjustment of the seat back and without in any way requiring readjustment after the seat back is restored to its upright or otherwise adjusted reclined position.

BRIEF DESCRIPTION OF THE DRAWINGS

FIG. 1 is a side elevation of a seat back adjuster hinge incorporating the improvement of the present invention;

FIG. 2 is a sectional view taken along the line 2—2 of FIG. 1;

FIG. 3 is a sectional view taken along the line 3—3 of FIG. 1;

FIG. 4 is a side elevation taken along the line 4—4 of FIG. 2;

FIG. 5 is a side elevation of a modified seat back adjuster hinge;

FIG. 6 is a sectional view taken along the line 6—6 of FIG. 5;

FIG. 7 is a side elevation of a second modification of a seat back adjuster hinge;

FIG. 8 is a side elevation of a third modification of a seat back adjuster hinge;

FIGS. 8a, b and c are fragmentary enlarged views of portions of FIG. 8;

FIG. 8d is an exploded view of the hinge sturcture of FIG. 8;

FIG. 9 is a sectional view taken along the line 9—9 of FIG. 8.

With reference to FIGS. 1 to 4 the hinge comprises a main lower bracket 10 adapted for attachment to a vehicle seat through bolt holes 11 and 12; an upper bracket 13 adapted for attachment to the back rest of the seat through bolt holes 14 and 15; a pivot bolt 16 connecting the upper and lower brackets through a main pivot bushing 17, which serves also as a pivot for an intermediate plate 18 in turn connected by an intermediate plate stud 19 to the lower bracket 10 through an arcuate slotted opening 20 having a radius centered on the main pivot and to a ratchet 21 through a short slotted opening 22. A rivet 23 for ratchet 21 provides a pivotal mounting for the ratchet on the lower seat bracket 10 and a pawl 24 pivotally mounted to the lower bracket by a pawl hinge bolt 25 has teeth 26 interengaging with teeth 27 on the ratchet 21 being held in position by an eccentric cam 28 pivotally mounted by a lower cam rivet 29 to the lower bracket 10 and actuated by a hand lever 30 which is keyed to the cam 28. A cover 31 is retained by rivets 23, 25 and 29 and serves as a spacer for retaining the ratchet 21, pawl 24, cam 28 and hand lever 30 in functional alignment for pivotal operation on the respective rivets.

Figure 1A:
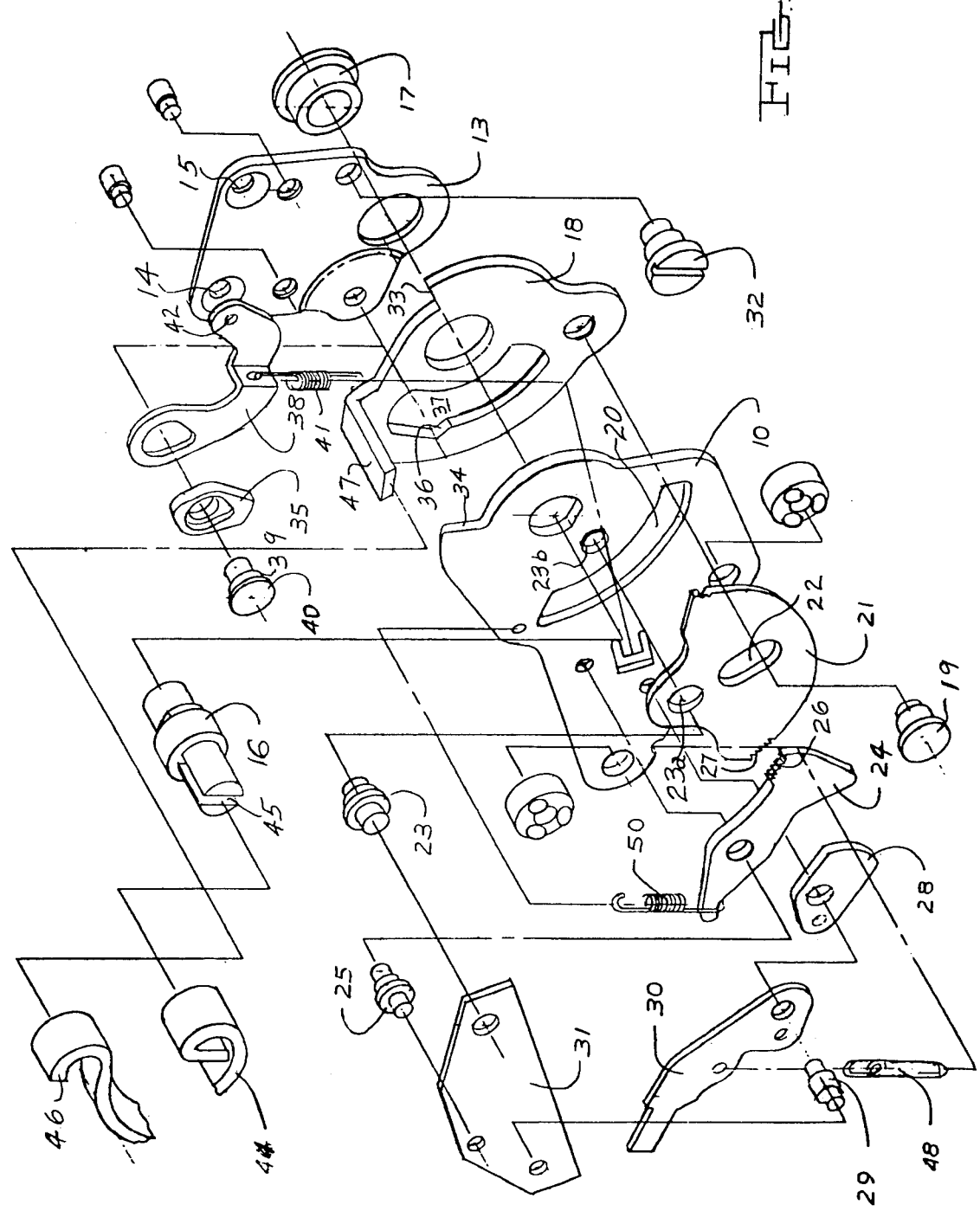
FIG. 1A is an exploded view of the hinge structure of FIG. 1.

A pivotal relation between the upper bracket 13 and intermediate plate 18 is limited by a stud 32 engageable with a shoulder 33 on the plate 18 establishing the normal backrest position and a shoulder 34 on the lower bracket 10 establishing the forward dump position for the seat back which is normally locked in the position shown in FIG. 1 by a dump lock 35 engaging a shoulder 36 formed in the slotted opening 37 in the intermediate plate 18 as most clearly illustrated in FIG. 4. The dump lock 35 is keyed to a dump lever 38 by an interengaging projection 39 on the rivet 40 which provides a pivotal mounting for the dump lever 38 to the upper bracket 13. A spring 41 normally retains the dump lever 38 in its locked position as shown in FIG. 4 and may be manually actuated through a cable, not shown, attached to a hole 42 in the end of the dump lever for releasing the dump lock 35 to permit forward tilting of the seat back.

A coiled return spring 43 anchored at one end 44 in a slotted opening 45 in the pivot bolt 16 and at the other end 46 to a projection 47 extending from the intermediate plate 18 is pre-tensioned to urge the seat back from any reclined position to its normal upright position as shown in FIG. 1.

A spring 48 anchored in a notch 49 in the lower bracket 10 urges the hand lever 30 and cam 28 to an engaged position of the pawl 24 and teeth 26, 27 for any adjusted position of the seat back. Manual actuation of the hand lever 30 moving the cam 28 in a clockwise direction releases the pawl 24 permitting it to pivot in a clockwise direction with assistance of the spring 50 freeing the engagement of teeth 26 and 27 to permit adjustment of the seat back to any position within the adjustment range accommodate by the slotted opening 20 and intermediate plate stud 19 which engages such slot.

In order to clarify the interrelation of the foregoing elements involved in effecting the translation adjustment hereinafter described, the configuration of each such element will be further described with reference to FIGS. 1 and 4. Lower seat bracket 10 includes anchor hole 50a for spring 50, shoulder 34 extending from arcuate surface 34a centered on pivot bolt 16 and includes arcuate slot 20 also centered on pivot bolt 16. Lower bracket 10 also provides an anchor for rivet 23 forming the pivot for symmetrical ratchet 21 which extends as a toothed arcuate segment from its upper end wall 21a to lower end wall 21b being driven about its pivot 23 during adjustment by intermediate plate stud 19. Upper back rest bracket 13, for purposes of adjustment of seatback position, may be assumed to operate in fixed relation to intermediate plate 18 as being illustrated in FIG. 4 and to pivot about bolt 16 relative to lower seat bracket 10. Intermediate plate stud 19 extending through slot 20 in lower bracket 10 limits the total arcuate travel of the seatback upper bracket 13 relative to lower seat bracket 10. In effecting seatback adjustment, bracket 13 pivoting on bolt 16 moves intermediate plate stud 19 in an arc established by the radius between pivot bolt 16 and stud 19, stud 19 in turn moving ratchet 21 (when pawl teeth 26 are disengaged) about its pivotal center 23 through engagement of stud 19 with slotted opening 22 in ratchet 21.

Translation in the relative movement of the ratchet 21 about its pivotal center 23 on the lower bracket and the pivotal movement of the intermediate plate 18 about its pivotal center on the pivot bolt 16 incident to the ratio of the shorter radius between the stud 19 and the ratchet rivet 23 relative to the radius between the stud 19 and bolt 16 provides a greater displacement of the ratchet 21 for a given angular displacement of the seat back thereby providing a relatively finer increment of adjustment for a given tooth pitch than would result in the absence of such translation. Thus, stud 19 provides a differential translation connection between the intermediate plate 18, which is directly responsive to seatback angle of adjustment, and ratchet plate 21 having an amplified rate of angular displacement relative to that of the seatback due to the differential ratio of such connection relative to the pivot centers of the respective intermediate and ratchet plates.

With reference to the exploded view of FIG. 1A it will be seen upper bracket 13 and intermediate plate 18 are pivotally connected on a common center by pivot bolt 16 through pivot bushing 17 while ratchet 21 is pivotally connected by rivet 23 and holes 23a and 23b to lower bracket 10 so as to be driven with amplified angular motion by intermediate plate stud 19 upon any adjustment of the back rest.

Referring to FIGS. 5 and 6 a modified construction for the forward dump provision is illustrated wherein the intermediate plate 118 is provided with a projecting stud 75 which engages an arcuate slot 76 provided in the upper bracket 113 having a radius centered on the main pivot bolt 116. The dump lock in this case comprises a dog 77 pivotally connected by pin 78 to the upper bracket 113 having an arcuate end 79 adapted to engage the projecting stud 75 of the intermediate plate 118 to block forward tilting of the seat back. The dog 77 is normally retained in locking position by coiled spring 80 and may be retracted to free the seat back for forward dumping by manually actuated pull rod 81. A stop pin 82 projecting from the upper bracket 113 serves to limit the forward dump position by engagement with a recess 83 in the lower bracket 110. The projecting stud 75 serves also as an anchor for the end 146 of the return spring 143 and in other respects the modified construction is substantially identical to the FIGS. 1 to 4 embodiment.

With reference to FIG. 7 a further modification is shown wherein an anchor bolt 84 projecting from the intermediate plate 218 serves to retain the end 246 of the return spring a shoulder of which serves as a stop for surface 85 of the upper bracket 213 limiting its rearward travel relative to the intermediate plate 218.

With reference to FIGS. 8 and 9 the further modification includes a special preferred tooth form and guide surface at the respective ends 251 and 252 of the ratchet 253 adapted to cooperate with the end teeth of the pawl 254 to assure against overtravel and misengagement at the extremities of the ratchet travel established by the respective ends 255 and 256 of the slot 257 in the lower bracket 258 with the stud 259 in the intermediate plate 260. Such provision, as best illustrated in FIGS. 8a, b, c, and d prevents malfunction and damage from any partial engagement beyond the last full tooth engagement position of the pawl and ratchet which might arise through tolerance variations relative to the effective stop controlling the end travel of the ratchet, thereby accommodating a relatively finer tooth pitch with resultant finer degree of adjustment for the angular position of the seat back then would otherwise be possible.

The end 251 of the ratchet 253 as shown in the enlarged view of FIG. 8a includes a rounded projection 261 terminating in a recessed surface 262 having a 73° angular relation with the opposed tooth engaging surface 263 as compared with a 62° included angle for the remaining teeth. As shown in FIG. 8b the end tooth 264 of the pawl 254 is also provided with a 73° matching angle with the end surface 265 projecting substantially beyond the root 266 of adjacent teeth to provide an extended surface which is assured of engaging the projection 261 in the event of any tolerance overtravel in order to produce a corrective alignment of the pawl and ratchet in proper last full tooth engagement upon actuation of the pawl to a locked position. The remaining teeth of the pawl are provided with a matching 62° angle for a full eight tooth meshing engagement with the ratchet. As shown by the superimposed circular arc touching the extremities of pawl teeth in FIG. 8b, the end tooth 265 having a 73° included angle, is somewhat foreshortened so as not to prevent full engagement of the other teeth, having only a 62° angle, at their intermediate positions.

With reference to FIG. 8c the end 252 of the ratchet is provided with a projection 267 having an extended surface 268 on one side of the last 62° angle tooth recess 269 which will assure engagement by a corresponding extended surface 270 of the last tooth 271 of the pawl shown in FIG. 8b. In this case the surface 270 of a 62° included angle operates satisfactorily to guide the extended surface of the last 62° tooth of the pawl into correct last tooth position engagement with the ratchet as in the case of the other extremity.

As mentioned above this provision accommodates a finer tooth pitch than otherwise possible with acceptable commercial tolerances for the parts contributing to the relative end stop position of pawl and ratchet, in the present case accommodating a 2° tooth pitch which combined with the translation drive for the ratchet permits a fine seat adjustment of approximately 1°.

With reference to FIGS. 8 and 9 a coiled spring 272 mounted within a cup 273 riveted at 274 to the lower bracket 258 has one end anchored at 275 to the extension of the pawl 254 and the other end anchored at 276 to the handle 277 in a manner such that pretensioning of the spring tends to rotate the handle 277 pivoted on the rivet 274 in a counterclockwise direction forcing the cam surface 278 into locking engagement with the pawl 254. Manual actuation of the handle 277 in a clockwise direction rotates the cam surface 278 in an unlocking direction upon which the pretensioning of the spring 272 urges the pawl extension at 275 in a clockwise release direction about its pivot 279 thus assuring complete disengagement and freedom from ratcheting noise and associated tooth wear, particularly important in the case of fine pitch teeth, upon sufficient release travel of the handle 277.

The coiled spring 241 connected to an extension 280 of the dump lever 238 at one end (similar to spring 41 in FIGS. 1 and 4) and at the other end to a clip 281 attached to the intermediate plate 218 serves to hold the dump lock 235 in engaged position in slotted opening 237 and is preferred over the spring 41 connections of FIGS. 1 and 4 because the angular relationships between dump lever 238 and intermediate plate 218 as do the respective anchor points for spring 41 in the FIG. 1 embodiment do not change with adjustment of the backrest. Thus, instead of the lock lever 238 being biased to a lock position by a spring anchored to the seat bracket 258 corresponding to the spring 41 being anchored to bracket 10 in FIG. 1, biasing of lever 238 to an engaged position of dump lock 235 is effected by spring 241 reacting against clip 281 attached to intermediate plate 218 which bears the same angular relationship to dump lever 238 throughout all positions of adjustment of the seatback.

The angular relationship shown between the cam face 278 and the abutting surface of the pawl 254 is desirable in order that reaction forces resulting from backrest pressured tooth engagement may be divided between the two pivots of the respective pawl and cam.

With further reference to FIG. 8C an optional alternate construction for the end of the toothed sector is shown by the dotted line 267a which lies along an arcuate extension of the outer extremities of the teeth. In such alternate construction the projection beyond such dotted line is eliminated and any misengagement from overtravel beyond the last full tooth engagement position is avoided by the last tooth of the pawl riding on the surface 267a preventing any engagement of the pawl teeth until the seat back is moved back slightly to permit full engagement of the pawl in the last full tooth engagement position. Such alternate provision is satisfactory at the extremity of toothed sector travel indicated at reference numeral 252 in FIG. 8 since the pivoting of the pawl about pivot 279 will cause all remaining teeth of the pawl to be held out of engagement in an overtravel condition with the last pawl tooth engaging the surface 267a. A like provision at the other end of the ratchet would not be inadequate, however, since the innermost teeth of the pawl are the first to engage. Accordingly, a provision comparable to that illustrated in FIG. 8A to prevent such engagement upon overtravel is required where the fine pitch and tolerances combine to create the possibility of overtravel leading to partial tooth engagement beyond the last full tooth engagement position.

We claim:

1. A fine increment seat back adjuster for vehicle seats having a tiltable backrest member comprising a first hinge member connectable to a seat rest member, a second hinge member connectable to a backrest member, a first pivot means connecting said hinge members for relative pivoting movement, drive engageable means for adjusting the operative pivotal position of said second hinge member, a ratchet plate having a circular arcuate toothed sector, a second pivot means spaced from said first pivot means connecting said ratchet plate and first hinge member, a differential translation drive connection between said drive engageable means and ratchet plate spaced relatively more from said first and relatively less from said second pivot means so as to provide an amplified angular displacement of said ratchet plate about said second pivot means for any corresponding angular displacement of said operative pivotal position of said second hinge member about said first pivot means, manually releasable toothed pawl means mounted on said first hinge member for engagement and retention of said toothed sector in any adjusted angular position of said ratchet plate relative to said first hinge member, stop means for limiting the extremities of movement of said ratchet plate relative to said pawl, and means for positively preventing overtravel of said ratchet plate to a position limited by said stop means where pawl engagement cannot produce full tooth engagement.

2. A seat back adjuster as set forth in claim 1 wherein said stop means is located to limit the arcuate travel of said second hinge member relative to said first hinge member.

3. A seat back adjuster as set forth in claim 1 wherein said stop means is located to limit the arcuate travel of said second hinge member relative to said first hinge member at a radius equal to said translation connection.

4. A seat back adjuster as set forth in claim 1 wherein said means for positively preventing overtravel comprises interacting guide surface means between the respective ends of said pawl and ratchet plate for producing a relative counter-overtravel displacement prior to initial tooth engagement to a position where full tooth engagement is assured.

5. A seat back adjuster as set forth in claim 1 wherein said interacting guide surface means project to a position of an operative engagement extending beyond the relative released position of said toothed sector and pawl means.

6. A seat back adjuster as set forth in claim 1 wherein the last tooth at one end of said pawl means has as included angle greater than the generally prevailing interengaging tooth angle of said sector and pawl means serving to amplify the relative overtravel corrective movement of toothed sector and pawl means responsive to locking movement of the pawl.

7. A seat back adjuster as set forth in claim 1 including resilient means biased to fully disengage said tooth sector and pawl means upon manual release.

8. A seat back adjuster as set forth in claim 1 wherein said resilient means comprises a single coiled spring with its respective ends pretensioned to respectively oppose manual release and assist pawl release.

9. A seat back adjuster for vehicle seats having a tiltable backrest member comprising a first hinge member connectable to a seat rest member, a second hinge member connectable to a backrest member, a first pivot means connecting said hinge members for relative pivoting movement, drive engageable means for adjusting the operative pivotal position of said second hinge member, a ratchet plate having a circular arcuate toothed sector, a second pivot means spaced from said first pivot means connecting said ratchet plate and first hinge member, a differential translation drive connection between said drive engageable means and ratchet plate spaced relatively more from said first and relatively less from said second pivot means so as to provide an amplified angular displacement of said ratchet plate about said second pivot means for any corresponding angular displacement of said operative pivotal position of said second hinge member about said first pivot means, manually releasable toothed pawl means mounted on said first hinge member for engagement and retention of said toothed sector in any adjusted angular position of said ratchet plate relative to said first hinge member, and a cover riveted to said first hinge member providing a spaced sandwich support for the pivotal connections of said ratchet and manually releasable toothed pawl means.

10. A fine increment seat back adjuster for vehicle seats having a tiltable backrest member comprising a first hinge member connectable to a seat rest member, a second hinge member connectable to a backrest member, a first pivot means connecting said hinge members for relative pivoting movement, drive engageable means for adjusting the operative pivotal position of said second hinge member, a ratchet plate having a circular arcuate toothed sector, a second pivot means spaced from said first pivot means connecting said ratchet plate and first hinge member, a differential translation drive connection between said drive engageable means and ratchet plate spaced relatively more from said first and relatively less from said second pivot means so as to provide an amplified angular displacement of said ratchet plate about said second pivot means for any corresponding angular displacement of said operative pivotal position of said second hinge member about said first pivot means, toothed pawl means pivotally mounted on said first hinge member for engagement and retention of said toothed sector in any adjusted position of said ratchet plate relative to said first hinge member, manually releasable cam means pivotally mounted on said first hinge member for engagement and retention of said pawl means in operative position, and engagement surfaces for said pawl and cam means adapted to divide reaction forces from the pawl and ratchet tooth engagement between said respective pivotal connections when backward pressure is applied on the backrest member.

11. A seat back adjuster for vehicle seats having a tiltable backrest member comprising a first hinge member connectable to a seat rest member, a second hinge member connectable to a backrest member, a first pivot means connecting said hinge members for relative pivoting movement, drive engageable means for adjusting the operative pivotal position of said second hinge member, a ratchet plate having a circular arcuate toothed sector, a second pivot means spaced from said first pivot means connecting said ratchet plate and first hinge member, a differential translation drive connection between said drive engageable means and ratchet plate spaced relatively more from said first and relatively less from said second pivot means so as to provide an amplified angular displacement of said ratchet plate about said second pivot means for any corresponding angular displacement of said operative pivotal position of said second hinge member about said first pivot means, toothed pawl means pivotally mounted on said first hinge member for engagement and retention of said toothed sector in any adjusted angular position of said ratchet plate relative to said first hinge member, a manually releasable cam pivotally mounted on said first hinge member for engagement and retention of said pawl in operative engagement, and a coiled spring having its ends operatively connected respectively to said cam and pawl means, said ends being tensioned through said coiled spring to urge said cam means in an engaging direction and said pawl means in a disengaging direction whereby manual release of said cam means may be effective to assist in the full release of said pawl means.

12. A seat back adjuster as set forth in claim 11 including resilient means biased to fully disengage said toothed sector and pawl means upon manual release, said resilient means comprising a single coiled spring with its respective ends pretensioned to respectively opppose manual release and assist pawl release.

* * * * *